US011235499B2

(12) United States Patent
Dominguez Cuevas et al.

(10) Patent No.: US 11,235,499 B2
(45) Date of Patent: Feb. 1, 2022

(54) NATURAL FIBER LAYER WITH INJECTION MOLDED SURFACE

(71) Applicant: GM GLOBAL TECHNOLOGY OPERATIONS LLC, Detroit, MI (US)

(72) Inventors: Jesus Edgar Dominguez Cuevas, Jiutepec (MX); Alejandro Barrera Torres, Metepec (MX); Carlos Alfonso Gutierrez Miranda, Capultitlan (MX)

(73) Assignee: GM Global Technology Operations LLC, Detroit, MI (US)

( * ) Notice: Subject to any disclaimer, the term of this patent is extended or adjusted under 35 U.S.C. 154(b) by 219 days.

(21) Appl. No.: 16/265,441

(22) Filed: Feb. 1, 2019

(65) Prior Publication Data
US 2020/0247022 A1 Aug. 6, 2020

(51) Int. Cl.
| B32B 27/12 | (2006.01) |
| B60R 13/02 | (2006.01) |
| B29C 45/14 | (2006.01) |
| B29C 45/16 | (2006.01) |
| B32B 5/02 | (2006.01) |
| B29L 31/30 | (2006.01) |
| B29K 101/12 | (2006.01) |

(52) U.S. Cl.
CPC .... *B29C 45/14786* (2013.01); *B29C 45/1418* (2013.01); *B32B 5/022* (2013.01); *B32B 27/12* (2013.01); *B29K 2101/12* (2013.01); *B29K 2713/02* (2013.01); *B29K 2995/0097* (2013.01); *B29L 2031/3041* (2013.01); *B32B 2262/065* (2013.01); *B32B 2307/732* (2013.01); *B32B 2605/003* (2013.01)

(58) Field of Classification Search
None
See application file for complete search history.

(56) References Cited

U.S. PATENT DOCUMENTS

| 5,830,548 A * | 11/1998 | Andersen | B32B 27/20 |
| | | | 428/36.4 |
| 7,993,737 B2 | 8/2011 | Tanaka et al. | |
| 10,246,023 B2 | 4/2019 | Gutierrez Guzman et al. | |
| 2006/0008624 A1* | 1/2006 | Cowelchuk | B60R 13/0243 |
| | | | 428/174 |
| 2014/0159283 A1 | 6/2014 | Lee et al. | |
| 2015/0064395 A1* | 3/2015 | Hayes | B32B 29/02 |
| | | | 428/116 |
| 2015/0367533 A1 | 12/2015 | Schnabel | |
| 2016/0176124 A1 | 6/2016 | Tranquart et al. | |
| 2016/0214287 A1 | 7/2016 | Buehler et al. | |
| 2016/0332340 A1* | 11/2016 | Rijpkema | D04H 1/558 |
| 2017/0282412 A1 | 10/2017 | Pickett et al. | |
| 2018/0345548 A1 | 12/2018 | Ngem et al. | |

FOREIGN PATENT DOCUMENTS

| CN | 103260843 A | 8/2013 |
| CN | 107073773 A | 8/2017 |
| WO | 2012085070 | 6/2012 |

OTHER PUBLICATIONS

U.S. Appl. No. 15/911,877, filed Mar. 5, 2018 by GM Global Technology Operations LLC, titled "Vehicle Interior Handle with Encapsulated Core and Corresponding Method of Manufacture.".
Chinese National Intellectual Property Administartion. First Office Action for Chinese application No. 202010078989.3, dated Jul. 13, 2021, pp. 1-11.

* cited by examiner

*Primary Examiner* — Sheeba Ahmed
(74) *Attorney, Agent, or Firm* — Vivacqua Crane PLLC

(57) ABSTRACT

A composite article has an interior layer comprising a natural fiber and an exterior layer injection molded onto the interior layer. The exterior layer forms an outer surface over the interior layer. A method of forming the composite article includes providing a base layer comprising a natural fiber and providing a first tool and a second tool. The first and second tools are configured to cooperate to form a cavity therebetween. The first tool has an injection molding channel formed therein. The base layer is inserted into the cavity between the first and second tools and pressed into a desired shape. A liquid polymeric material is inserted through the injection molding channel of the first tool and onto a surface of the base layer to form an injection molded layer of the polymeric material on the base layer.

19 Claims, 4 Drawing Sheets

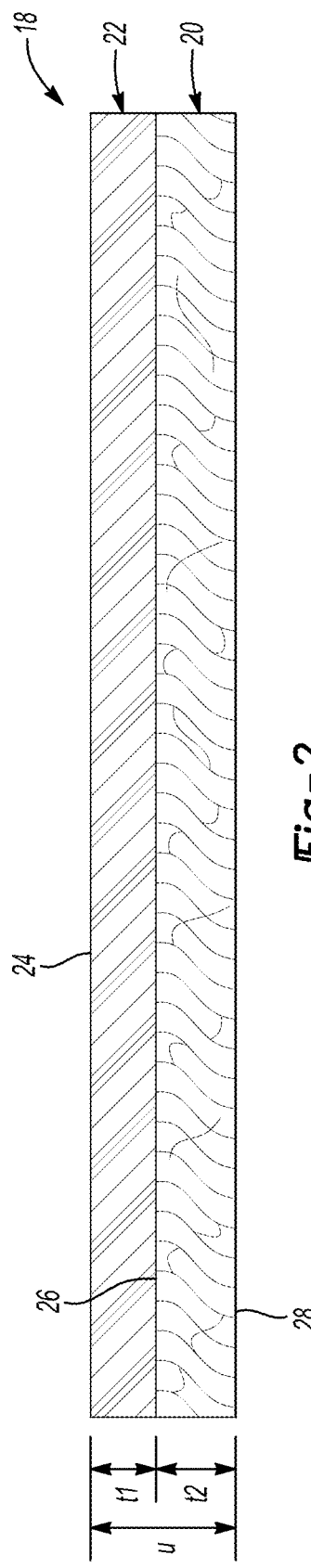
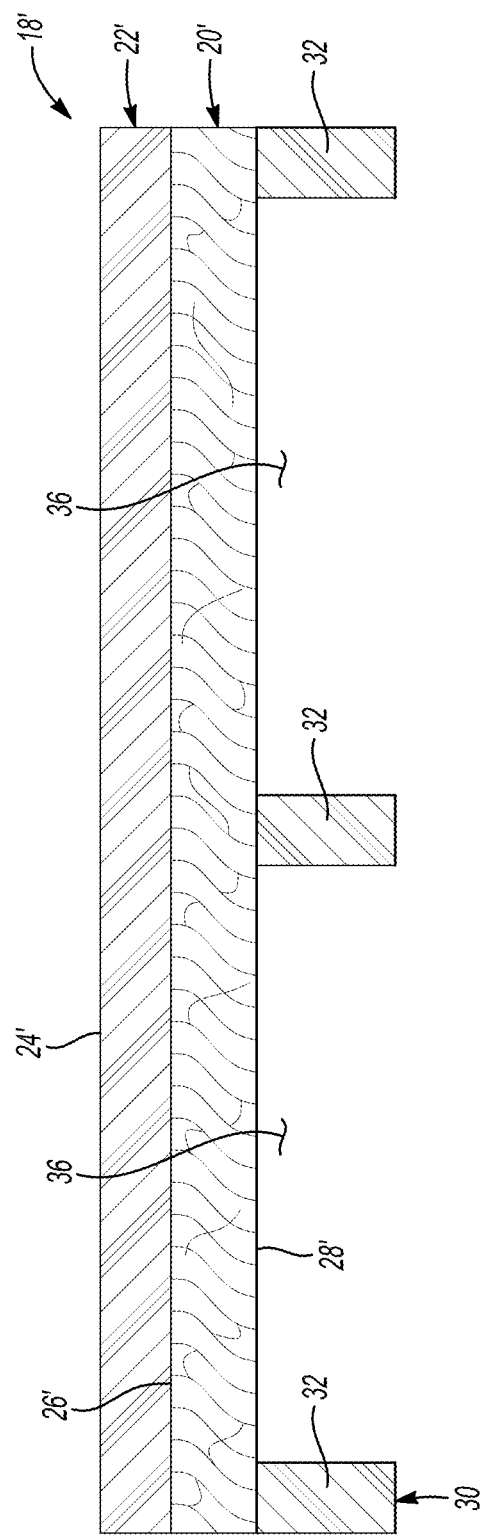

NATURAL FIBER LAYER WITH INJECTION MOLDED SURFACE

FIELD

The disclosure relates to a composite article including a base layer comprising a natural fiber an injection molded layer formed on the base layer.

INTRODUCTION

Surfaces within automotive interiors may be formed in a variety of ways. In some examples, injection molded surfaces are used. While such injection molded surfaces may be formed with an aesthetically pleasing "class A" surface, a minimum thickness is often required to provide a desired amount of rigidity.

In other examples, a mat including a natural fiber may be provided as a base material, but such a material may not have a sufficiently pleasing aesthetic surface, and additional structure may be needed to provide sufficient rigidity. To provide a more desirable appearance, a skin may be added over the mat to provide a sufficiently aesthetically pleasing surface, and one or more structural members may be attached to a rear side of the mat to add rigidity. The resultant interior surface part has a certain amount of thickness and complexity.

SUMMARY

The present disclosure provides a composite article that includes an interior layer comprising natural fiber and an injection molded layer that is injection molded over the interior layer to provide an aesthetically pleasing surface. The combination of the interior layer containing natural fiber and the injection molded outer layer may also provide sufficient rigidity such that the overall composite article may be thinner than previous interior automotive panels.

In one example, which may be combined with or separate from other examples provided herein, a composite article includes an interior layer comprising a natural fiber and an exterior layer injection molded onto the interior layer. The exterior layer forms an outer surface over the interior layer.

In another example, which may be combined with or separate from other examples provided herein, a method of forming a composite article is provided. The method includes providing a base layer comprising a natural fiber. The method also includes providing a first tool and a second tool, where the first and second tools are configured to cooperate to form a cavity therebetween, and the first tool forms an injection molding channel therein. The method includes inserting the base layer into the cavity between the first and second tools and pressing the base layer into a desired shape. The method further includes flowing a liquid polymeric material through the injection molding channel of the first tool and onto a surface of the base layer to form an injection molded layer of the polymeric material on the base layer.

Additional features may optionally be provided, including but not limited to the following: the outer surface or outer side of the injection molded layer having a class A finish; the natural fiber comprising hemp, jute, and/or kenaf; the exterior layer (or injection molded layer) comprising a polymer, such as polypropylene, polyether ether ketone (PEEK), and/or thermoplastic olefin (TPO); the interior layer (or base layer) further comprising a polymer; the interior layer (or base layer) being provided as a mat formed of a mixture of about 50 weight percent of a polymer and about 50 weight percent of the natural fiber; the interior layer (or base layer) being formed of a mat of the natural fiber and a polymeric spray coating disposed on the mat; the exterior layer (or injection molded layer) being injection molded to an outer side of the interior layer (or base layer); a structure injection molded to an inner side of the interior layer (or base layer); the structure being formed of a polymer and comprising structural members separated by hollow space; the exterior layer (or injection molded layer) forming a continuous surface over the interior layer (or base layer); the composite article forming a portion of interior of an automotive vehicle; the composite article being a door bolster or a door map pocket; the method further comprising compressing the injection molded layer and the base layer together to decrease a thickness of the base layer.

The exterior layer (or injection molded layer) may have a thickness in the range of about 1.0 mm to about 2.5 mm, and the interior layer (or base layer) may have a thickness in the range of about 1.2 mm to about 2.5 mm. In some examples, the exterior layer has a thickness of about 1.0 mm and the interior layer have a thickness of about 1.2 mm, so that the part has a total thickness of 2.2 mm.

The above features and advantages and other features and advantages of the present disclosure will be readily apparent from the following detailed description when taken in connection with the accompanying drawings and appended claims.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of this disclosure. In the drawings:

FIG. 2 is a cross-sectional view of the composite article of FIG. 1, according to the principles of the present disclosure;

FIG. 4 is a cross-sectional view of the variation of the composite article shown in FIG. 3, according to the principles of the present disclosure;

DETAILED DESCRIPTION

The following description is merely exemplary in nature and is not intended to limit the present disclosure or its application or uses.

Figure 1:
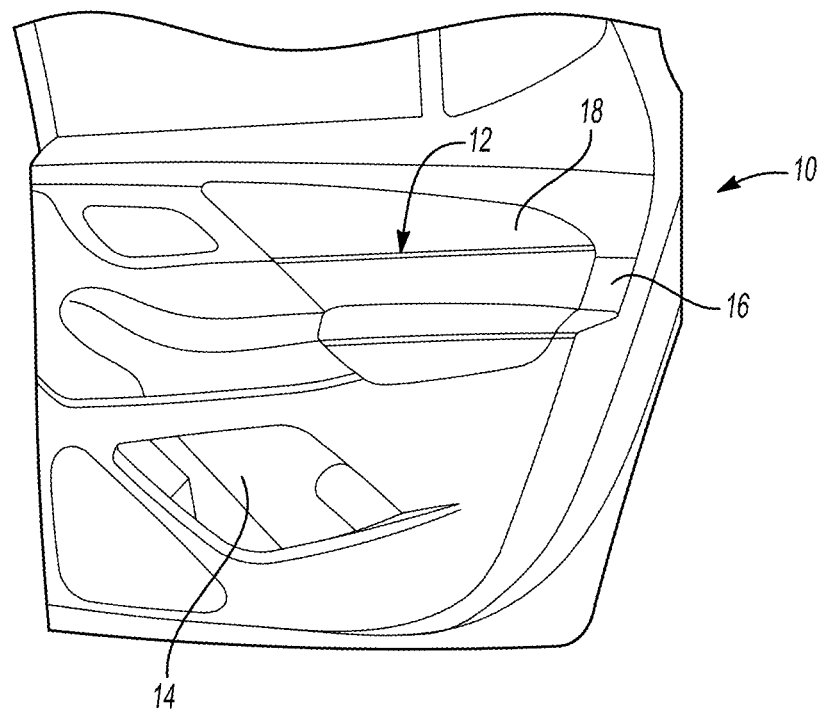
FIG. 1 is a perspective view of a vehicle door including a composite article, in accordance with the principles of the present disclosure.

Referring to the drawings, wherein like reference numerals refer to like elements, FIG. 1 shows a vehicle door 10 that includes a door bolster 12 attached thereto. A map pocket 14 is also attached to the door 10 or integrally formed with additional interior structure 16 of the door 10.

Referring now to FIG. 2, with continued reference to FIG. 1, the door bolster 12 is formed of a composite article 18. Though the composite article 18 is formed into the door bolster 12, it should be understood that the composite article 18 can also be formed into the map pocket 14, other automotive interior panels, or any other desired article.

The composite article 10 includes an interior layer or base layer 20. The base layer 20 comprises a natural fiber. For example, the base layer 20 may include hemp, jute, and/or kenaf, or any other desired natural fiber. The base layer 20 may also include a polymer. In some examples, the base layer 20 is a thermoplastic formed of a mat that is formed of a mixture of about 50% of a natural fiber and about 50% of a polymer. In other examples, the base layer 20 is a thermoset formed of a natural fiber mat having a polymeric spray coating disposed on the mat.

The composite article 10 also includes an exterior layer 22 injection molded onto the interior or base layer 20. The exterior layer 22 forms an outer surface 24 over the interior layer 20 that preferably has a class A finish. The class A finish of the outer surface 24 provides for an aesthetically pleasing look on the interior of the vehicle. The injection molded exterior layer 22 is preferably formed of a polymer, such as polypropylene, polyether ether ketone (PEEK), or thermoplastic olefin (TPO), or mixtures thereof. The interior layer 20 has an outer side 26 and an inner side 28. The exterior layer 22 is injection molded to and over the outer side 26 of the interior layer 20. In the illustrated example, the exterior layer 22 forms a continuous surface 24 over the interior layer 20 that is adhered to the interior layer 20.

The composite article 18 having the two layers 20, 22 formed of the materials described above results in a panel having a sufficient amount of rigidity, while still having an aesthetically please outer surface 24, and without requiring the composite article 18 to be overly thick. For example, the exterior layer 22 have may a thickness t1 in the range of about 1.0 mm to about 2.5 mm, and the interior layer 20 may have a thickness t2 in the range of about 1.2 mm to about 2.5 mm. Thus, the total thickness u of the composite article 18 may be in the range of about 2.2 mm to about 5 mm. Therefore, when in the lower end of this range, the total thickness u is thinner than other interior automotive panels commonly used in the industry.

Figure 3:
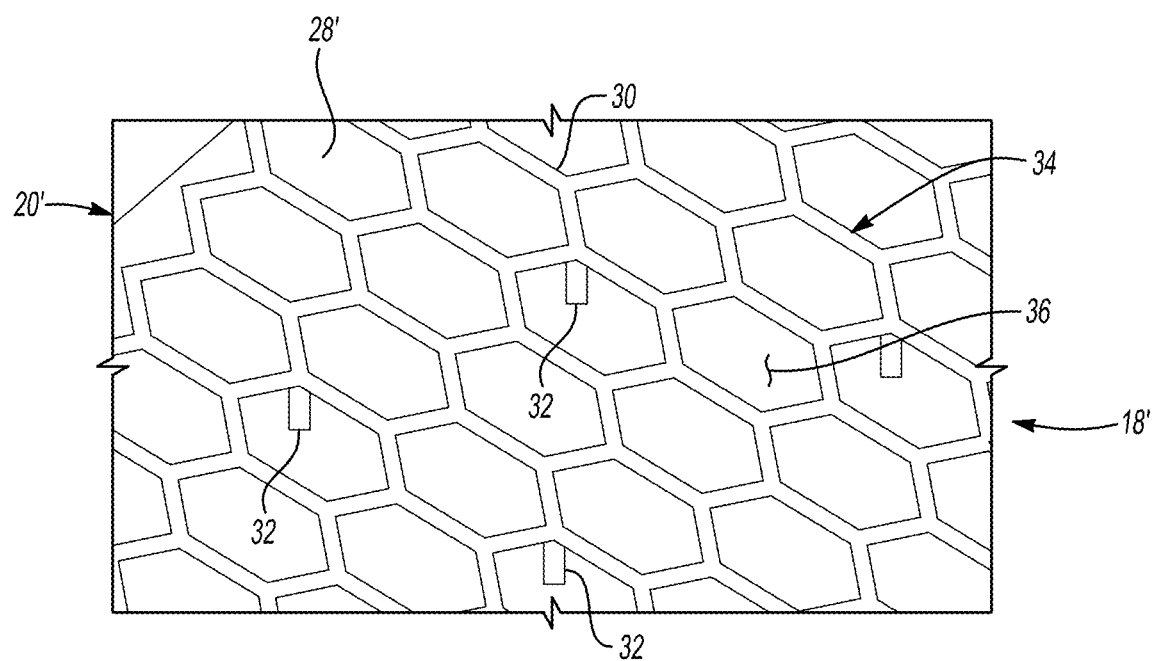
FIG. 3 is a perspective view of a rear side of another variation of the composite article shown in FIGS. 1-2, in accordance with the principles of the present disclosure.

Referring now to FIGS. 3-4, one variation of a rear side of the composite article is illustrated. For purposes of differentiation, each element previously shown in FIGS. 1-2 is shown with a prime symbol, or ', because the elements are the same as previously shown, but additional structure is attached to the rear side of the composite article 18' of FIGS. 3-4. Thus, the composite article 18' optionally includes a structure 30 injection molded to the inner side 28' of the interior layer 20' of the composite article 18'.

Like the exterior layer 22', the structure 30 may be formed a polymer, such as polypropylene, polyether ether ketone (PEEK), or thermoplastic olefin (TPO). The structure 30 may provide additional structural support for the composite article 18'. In the illustrated example, the structure 30 includes a plurality of structural members 32 in contact with and adhered to the inner side 28' of the base layer 20', and the structural members 32 are connected together by a honeycomb or hexagonal structure 34. The structural members 32 are separated from each other by hollow space 36 therebetween, and thus, the structural members 32, in this example, do not form a continuous surface over the inner side 28' of the base layer 20'. However, it should be understood that, in other examples, the structure 30 could be formed similarly to the exterior layer 22' such that it could form a continuous surface over the base layer 20'.

Figure 5:
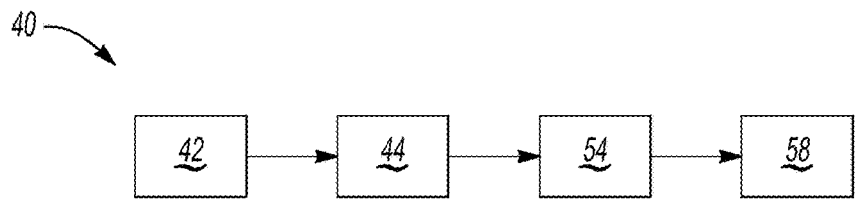
FIG. 5 is a block diagram illustrating a method of forming a composite article, in accordance with the principles of the present disclosure.
Figure 6:
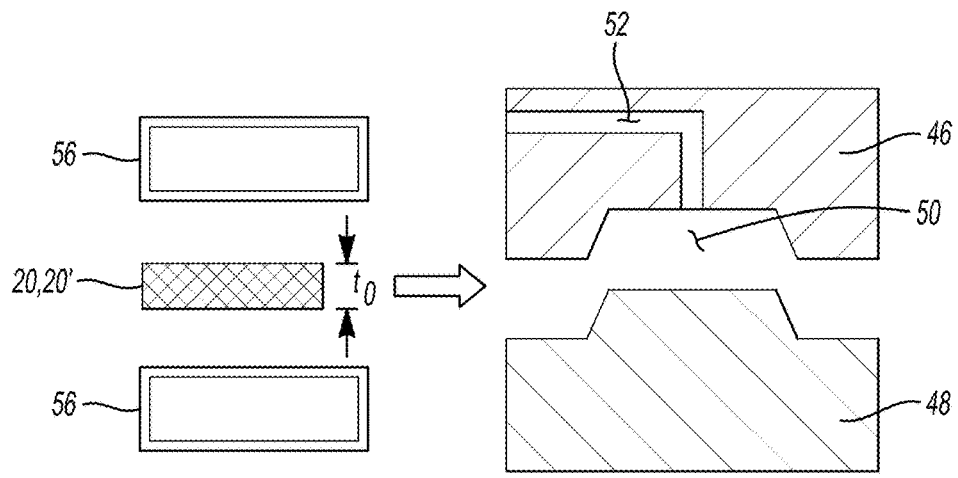
FIG. 6 is a schematic side cross-sectional view showing illustrations of steps of the method illustrated in FIG. 5, according to the principles of the present disclosure.
Figure 7:
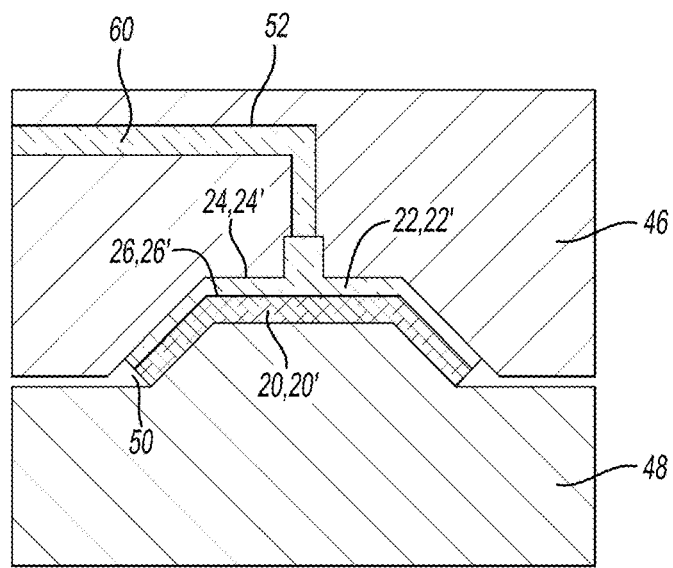
FIG. 7 is a schematic side cross-sectional view showing illustrations of additional steps of the method illustrated in FIG. 5, according to the principles of the present disclosure.
Figure 8:
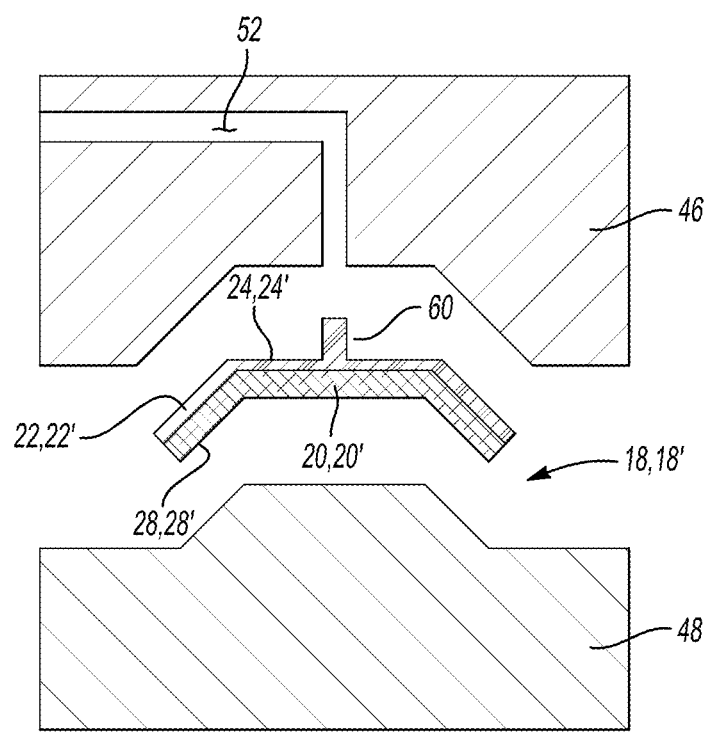
FIG. 8 is a schematic side cross-sectional view of showing illustrations of further additional steps of the method illustrated in FIG. 5, according to the principles of the present disclosure.

Referring now to FIGS. 5-8, steps for performing an exemplary method of forming the composite article 18, 18' are illustrated. In FIG. 5, a block diagram shows steps of the exemplary method 40, and in FIGS. 6-8, illustrations of elements, including optional elements, of the method 40 are shown. The method 40 includes a step 42 of providing the base layer 20, 20' that includes the natural fiber material. The base layer 20, 20' may be provided having an initial thickness $t_0$. In some variations, the initial thickness to may be in the range of about 12 to about 15 mm.

As described above, the base layer 20, 20' may include a thermoplastic or a thermoset mat. In a thermoplastic variation, the mat may be formed of a mixture of about 50% of a natural fiber and about 50% of a polymer. In a thermoset variation, a polymeric spray coating may be disposed on a natural fiber mat.

The method 40 also includes a step 44 of providing a first tool 46 and a second tool 48, where the first and second tools 46, 48 are configured to cooperate to form a cavity 50 therebetween. The first tool 46 has an injection molding channel 52 formed therein, which is used to form the injection molded exterior layer 22, 22'. The second tool 48 may also have a channel (not shown) for injection molding for making the version of the composite article 18' shown in FIGS. 3-4. Prior to placing the base layer 20, 20' into the tools 46, 48, one or more heaters 56 may be used to heat the base layer 20, 20'. For example, non-contact infrared heat may be used to heat the base layer blank 20, 20'.

Referring now to FIG. 7, the method 40 further includes a step 54 of inserting the base layer 20, 20' into the cavity 50 between the first and second tools 46, 48 and pressing the base layer 20, 20' into a desired shape. The method 40 includes a step 58 of flowing a liquid polymeric material 60 through the injection molding channel 52 of the first tool 46 and onto a surface 26, 26' of the base layer 20, 20' to form an injection molded layer 22, 22' of the polymeric material on the base layer 20, 20'. The injection liquid polymeric material 60 hardens to form the injection molded layer 22, 22' that is adhered to the surface 26, 26' of the base layer 20, 20'.

The method 40 may further include compressing the injection molded layer 22, 22' and the base layer 20, 20' together to decrease a thickness of each of the layers 20, 20', 22, 22'. For example, the base layer 20, 20' may be compressed from the initial thickness to $t_0$ a resultant thickness t2, and the injection molded layer 22, 22' may be compressed to a thickness of t1 prior to or while the injected material 60 is cooling. The method 40 may also optionally include forming a class A finish on an outer side 24, 24' of the injection molded layer 22, 22'.

Referring now to FIG. 8, the tools 46, 48 may then be separated, and the completed composite article 18, 18' may be ejected from the tools 46, 48. Excess material 60 may be trimmed after the composite article 18, 18' is ejected. The composite article 18, 18' may then already have a class A finished surface, except that the outer surface of the composite article 18, 18' may be polished to remove the excess material 60 from the composite article 18, 18'.

Though not shown in FIGS. 5-8, if desired, the method 40 may further include injection molding a structure 30 to the inner side 28' of the interior layer 20', as described above with respect to FIGS. 3-4, by flowing molten material through a channel formed within the second tool 48.

Though the method 40 illustrated in FIGS. 5-8 may be used to form the composite article 18, 18', it should be understood that alternative methods could be used to form the composite article 18, 18' instead, without falling beyond the spirit and scope of the present disclosure.

The description of the disclosure is merely exemplary in nature and variations that do not depart from the gist are intended to be within the scope of the present disclosure. Such variations are not to be regarded as a departure from the spirit and scope of the present disclosure.

What is claimed is:

1. A composite article comprising:
    an interior layer comprising a natural fiber;
    an exterior layer injection molded onto the interior layer, the exterior layer forming an outer surface over the interior layer, the exterior layer forming a continuous surface over the interior layer;
    a structure adhered to an inner side of the interior layer, the structure comprising a plurality of structural members extending along an axis that is perpendicular to a plane parallel to the inner side, wherein each structural member of the plurality of structural members is connected to a honeycomb structure, wherein each structural member of the plurality of structural members is separated from one another by a hollow space defined by the honeycomb structure.

2. The composite article of claim 1, the outer surface having a class A finish.

3. The composite article of claim 2, the natural fiber comprising at least one of: hemp, jute, and kenaf.

4. The composite article of claim 3, the exterior layer comprising a polymer.

5. The composite article of claim 4, the exterior layer comprising at least one of polypropylene, polyether ether ketone (PEEK), and thermoplastic olefin (TPO).

6. The composite article of claim 5, the interior layer further comprising a polymer, wherein each structural member of the plurality of structural members protrudes outwardly from the honeycomb structure.

7. The composite article of claim 5, the interior layer being a mat formed of a mixture of about 50 weight percent of a polymer and about 50 weight percent of the natural fiber.

8. The composite article of claim 5, the interior layer being formed of a mat of the natural fiber and a polymeric spray coating disposed on the mat.

9. The composite article of claim 6, wherein the exterior layer has a thickness in the range of about 1.0 mm to about 2.5 mm, and the interior layer has a thickness in the range of about 1.2 mm to about 2.5 mm.

10. The composite article of claim 9, the interior layer comprising an outer side and an inner side, the exterior layer being injection molded to the outer side of the interior layer, the composite article further comprising a structure injection molded to the inner side of the interior layer.

11. The composite article of claim 9 forming a portion of interior of an automotive vehicle.

12. The composite article of claim 11 being one of a door bolster and a door map pocket.

13. A method of forming the composite article of claim 1, the method comprising: providing a base layer comprising a natural fiber; providing a first tool and a second tool, the first and second tools being configured to cooperate to form a cavity therebetween, the first tool forming an injection molding channel therein; inserting the base layer into the cavity between the first and second tools and pressing the base layer into a desired shape; and flowing a liquid polymeric material through the injection molding channel of the first tool and onto a surface of the base layer to form an injection molded layer of the polymeric material on the base layer.

14. The method of claim 13, forming a class A finish on an outer side of the injection molded layer.

15. The method of claim 14, further comprising compressing the injection molded layer and the base layer together to decrease a thickness of the base layer.

16. The method of claim 15, further comprising: providing the natural fiber comprising at least one of: hemp, jute, and kenaf; providing the polymer comprising at least one of polypropylene, polyether ether ketone (PEEK), and thermoplastic olefin (TPO); and forming the base layer including the natural fiber and a polymer.

17. The method of claim 16, further comprising forming the base layer into a mat including a mixture of about 50 weight percent of a polymer and about 50 weight percent of the natural fiber.

18. The method of claim 16, further comprising forming the base layer by forming a mat of the natural fiber and a spraying a polymeric coating onto the mat.

19. The method of claim 16, the base layer comprising an outer side and an inner side, the injection molded layer being injection molded to the outer side of the base layer, the method further comprising injection molding a structure onto the inner side of the interior layer.

* * * * *